UNITED STATES PATENT OFFICE.

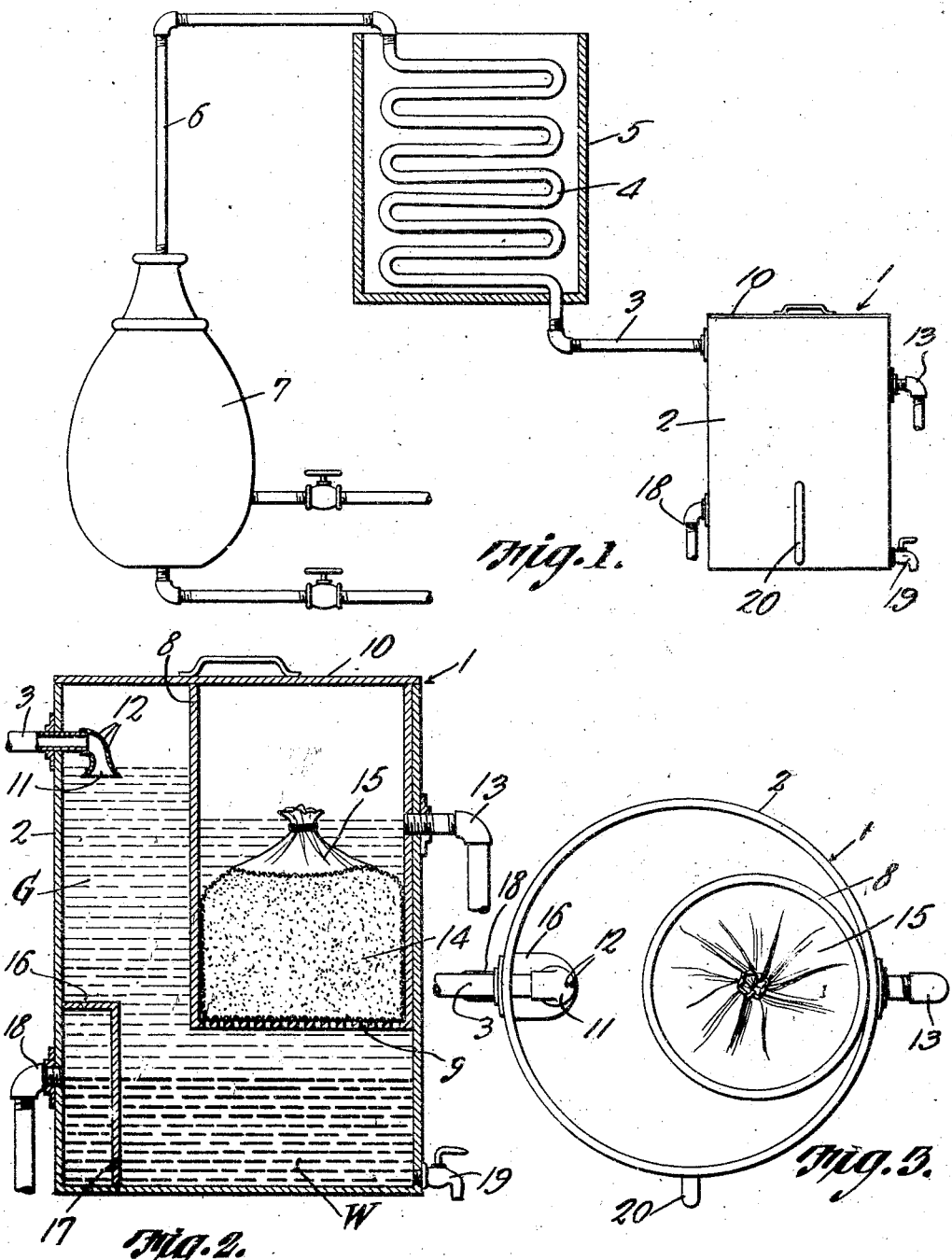

WALTER M. CRONENBERGER, OF TOLEDO, OHIO.

SEPARATOR AND FILTER.

1,152,399.  Specification of Letters Patent.  Patented Sept. 7, 1915.

Application filed June 12, 1915. Serial No. 33,844.

*To all whom it may concern:*

Be it known that I, WALTER M. CRONENBERGER, a citizen of the United States, residing at Toledo, in the county of Lucas and State of Ohio, have invented a new and useful Separator and Filter, of which the following is a specification.

The present invention appertains to separators and filters, and aims to provide a novel and improved separator and filter adapted especially for use in dry cleaning establishments for separating and filtering the gasolene and naphtha from the water, dirt, lint, fatty acids, and the like, so that the gasolene or naphtha will leave the apparatus in a clear condition, and free of water.

In dry cleaning establishments, it is the practice to repeatedly use the gasolene or naphtha, but difficulty has been experienced in the repeated use of the gasolene or naphtha, to free the same from all water and extraneous matter, since with ordinary methods and apparatus, the gasolene or naphtha even after passing through the separating and filtering mediums, is still grimy and damp. It has also been difficult, if not impossible, to utterly free the gasolene or naphtha of fatty acids, such as cause the rancid odor in under-ground gasolene tanks.

It is the object of this invention to provide a separator and filter adapted to receive the distillates from the still, for effectively separating the gasolene or naphtha from the water and other extraneous elements, in order that the gasolene may flow off to the storage tank in a clear condition, whereby the repeated use of the gasolene is not liable to leave the clothes in soiled or spotted condition, as is frequently the case according to present practice.

The present separating and filtering device embodies unique features of construction, to enhance the utility and efficiency thereof, the device, however, being comparatively simple and inexpensive in construction.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is an elevation of a dry cleaner's apparatus for distilling, condensing and separating the distillates, this view illustrating the improved separator and filter. Fig. 2 is an enlarged vertical section of the separator and filter. Fig. 3 is a plan view thereof, with the cover or lid removed.

The system or apparatus illustrated in Fig. 1, embodies the separator and filter 1 forming the subject matter of the present invention, and comprising a tank 2 having an inlet pipe 3 which is connected to the discharge end of a condensing coil 4 disposed within a cold water tank 5, and the receiving end of this coil 4 is connected by a pipe 6 to the still 7 in which the gasolene is vaporized. The gasolene vapor flows from the still 7 into the coil 4, wherein it is condensed, and flows into the tank 2. The invention, however, only concerns the separator and filter 1, and further reference to the still and condenser are not necessary, since they are well known in the art.

Disposed within the tank 2, is a can or receptacle 8 of smaller diameter and shorter length, one side of the receptacle 8 being secured in any suitable manner to one side of the tank 2 with the upper end of the receptacle 8 adjacent or flush with the upper end of the tank 2. The receptacle 8 is provided with a perforated or apertured bottom 9, and a cover or lid 10 for the tank 2 also serves to cover the receptacle. The inlet pipe 3 enters that side of the tank 2 opposite the receptacle 8 adjacent the upper end of the tank, and the inner or discharge end of the pipe 3 is provided with a downturned bell 11. The bend between the pipe 3 and its bell 11, is provided with upper apertures 12 above the bell 11, whereby the discharge of gasolene from the bell 11 into the tank 2 is facilitated, the bell 11 normally depending into the gasolene within the tank 2 below the gasolene level. In other words, apertures 12 allow air to flow into the pipe 3 behind the bell 11 so that the gasolene may flow from the bell 11 without creating a vacuum.

A gasolene outlet pipe 13 has one end engaged through the adjacent sides or walls of the tank 2 and receptacle 8 at a slightly lower level or horizontal plane than the pipe 3, and the gasolene is arranged to overflow into the discharge pipe 13, so that the gasolene level within the receptacle 8 is lower than the normal level within the tank 2.

Disposed within the lower portion of the receptacle 8, below the end of the outlet pipe 13, is the filtering medium or agent 14, which may be salt, wool, or other suitable material. It is preferable to confine the filtering agent or material 14 within a bag 15 which fits snugly within the lower portion of the receptacle 8, so as to be supported by the apertured bottom 9 of the receptacle. This enables the filtering material to be readily removed and replaced, and furthermore, the bag itself will also act as a filtering medium.

The tank 2 has a water or refuse chamber 16 therein adjacent its bottom and below the bell 11, and the lower end of the chamber 16 is provided with an inlet aperture 17 adjacent the bottom of the tank 2. A water discharge pipe 18 is engaged through the respective side of the tank to communicate with the interior of the chamber 16 between the upper and lower ends of said chamber.

The lower portion of the tank 2 is normally filled with water W which flows into the chamber 16, the water level being below the receptacle 8, or on a line with the upper end of the water outlet pipe 18. The upper end of the pipe 18 is disposed in a horizontal plane below the bottom 9 of the receptacle 8.

The tank 2 is preferably provided with a water gage 20 to indicate the level of the water within the tank, so that any abnormal level of the water may be rectified. The tank is also preferably provided with a lower drain cock 19 whereby the contents of the tank may be drained off therethrough whenever desired.

In operation, the gasolene G flows into the tank 2 from the pipe 3, and being lighter than the water W, will cause the gasolene to rise to the top in a stratum above the water. The water and heavier particles carried into the tank with the gasolene will settle to the bottom of the tank by precipitation, and the gasolene and lighter particles will find their way through the apertured bottom 9 of the receptacle 8. The gasolene filters upwardly through the filtering material 14 within the bag 15, and the extraneous or foreign particles are caught or arrested by the filtering material, so that when the gasolene rises out of the material 14, it will be in a clear state. The gasolene overflows from within the receptacle 8 into the pipe 13, from which pipe the gasolene may be run into the storage tank. The water W, dirt, lint, fatty acids, and the like, may pass downwardly through the aperture 17 into the chamber 16, so as to be discharged down the overflow pipe 13, said pipe being controlled by a suitable valve, if desired.

The present device is thus adapted to effectively separate the gasolene or lighter liquid from the water and other heavier liquids, and from extraneous solid particles, and the gasolene or lighter fluid will also be filtered, in order that the gasolene will flow in a clear state from the device. The gasolene may thus be used repeatedly with the same advantage of fresh or unused gasolene. The gasolene which has passed through the present device will be devoid of the grimy, damp and cloudy condition of gasolene treated by ordinary separators and filters. The gasolene will also be free of fatty acids which cause the rancid odors in under ground storage tanks. The other advantages and capabilities of the device will suggest themselves to those skilled in the art, without further comment being deemed necessary.

Having thus described the invention, what is claimed as new is:

1. A separator and filter, comprising a tank having an inlet, a receptacle disposed within the tank and having an apertured bottom, an outlet pipe leading from the receptacle, filtering material disposed within the lower portion of the receptacle below said pipe, the bottom of the receptacle being spaced above the bottom of the tank, the tank having a lower chamber adjacent its bottom, said chamber having an inlet aperture adjacent the bottom of the tank, and an outlet pipe communicating with the interior of the chamber above said aperture.

2. A separator and filter, comprising a tank, a receptacle disposed within the tank and secured to one side thereof, the receptacle having an apertured bottom spaced above the bottom of the tank, an inlet pipe engaged through the tank at that side opposite the receptacle, an outlet pipe engaged through the tank and receptacle, filtering material disposed within the receptacle below the outlet pipe, the tank having a lower chamber below the inlet pipe and adjacent the bottom of the tank, the said chamber having an inlet aperture adjacent the bottom of the tank, and an outlet pipe communicating with the interior of the said chamber above said aperture.

In testimony that I claim the foregoing as my own, I have hereto affixed my signature in the presence of two witnesses.

WALTER M. CRONENBERGER.

Witnesses:
D. E. REES,
JOE BECKLER.